United States Patent
Kim et al.

(10) Patent No.: US 10,703,212 B2
(45) Date of Patent: Jul. 7, 2020

(54) BATTERY PRE-HEATING APPARATUS FOR HYBRID VEHICLE AND CONTROL METHOD THEREFOR

(71) Applicant: Dae Wha Alloytech Co., Ltd, Myeoncheon-myeon Dangjin-si (KR)

(72) Inventors: Yoon Jin Kim, Yongin-si (KR); Jin Woo Cho, Seongnam-si (KR); Kwon Woo Shin, Hwaseong-si (KR); Ji Sun Park, Yongin-si (KR)

(73) Assignee: DAE WHA ALLOYTECH Co., Ltd. (KR)

( * ) Notice: Subject to any disclaimer, the term of this patent is extended or adjusted under 35 U.S.C. 154(b) by 186 days.

(21) Appl. No.: 15/573,905

(22) PCT Filed: Mar. 30, 2016

(86) PCT No.: PCT/KR2016/003283
§ 371 (c)(1),
(2) Date: Sep. 11, 2018

(87) PCT Pub. No.: WO2016/182199
PCT Pub. Date: Nov. 17, 2016

(65) Prior Publication Data
US 2019/0016232 A1 Jan. 17, 2019

(30) Foreign Application Priority Data
May 14, 2015 (KR) .......... 10-2015-0067236

(51) Int. Cl.
*B60L 7/10* (2006.01)
*H01M 10/42* (2006.01)
(Continued)

(52) U.S. Cl.
CPC ............. *B60L 11/1875* (2013.01); *B60L 7/10* (2013.01); *B60L 50/50* (2019.02); *B60L 58/12* (2019.02);
(Continued)

(58) Field of Classification Search
CPC ................................ H05B 3/28; H01M 10/615
See application file for complete search history.

(56) References Cited

U.S. PATENT DOCUMENTS 6,400,492 B1 * 6/2002 Morita .................... G02F 1/167
204/477
2010/0090171 A1 4/2010 Lee et al.
(Continued)

FOREIGN PATENT DOCUMENTS

DE 102009034307 1/2011
EP 2174910 4/2010
(Continued)

OTHER PUBLICATIONS

JP-2007272223-A Machine Translation. (Year: 2019).*
(Continued)

*Primary Examiner* — David V Henze-Gongola

(57) ABSTRACT

A battery pre-heating apparatus for a hybrid vehicle according to an embodiment of the present invention comprises: a battery composed of a plurality of battery cells; a power relay assembly comprising, for the charge and discharge control of the battery, a first main relay connected to a positive electrode of the battery and a second main relay connected to a negative electrode of the battery; and a pre-heater including at least one sheet heater formed of a heating paste composition, wire-connected between an output terminal of the first main relay and an output terminal of the second main relay, and pre-heating the battery to a predetermined temperature using generation power by (Continued)

regenerative braking, wherein the heating paste composition contains, on the basis of 100 parts by weight of the heating paste composition, 3-6 parts by weight of carbon nanotube particles, 0.5-30 parts by weight of carbon nanoparticles, 10-30 parts by weight of a mixed binder, 29-83 parts by weight of an organic solvent, and 0.5-5 parts by weight of a dispersant, the mixture binder being a mixture of epoxy acrylate, a polyvinyl acetal, and a phenol-based resin, or a mixture of hexamethylene diisocyanate, a polyvinyl acetal, and a phenol-based resin.

11 Claims, 10 Drawing Sheets

(51) Int. Cl.
    *H01M 10/615*     (2014.01)
    *H01M 2/10*     (2006.01)
    *B60L 11/18*     (2006.01)
    *B60W 10/26*     (2006.01)
    *H01M 10/44*     (2006.01)
    *H05B 3/28*     (2006.01)
    *B60L 58/27*     (2019.01)
    *B60L 58/12*     (2019.01)
    *B60L 50/50*     (2019.01)

(52) U.S. Cl.
    CPC ............. *B60L 58/27* (2019.02); *B60W 10/26* (2013.01); *H01M 2/1083* (2013.01); *H01M 10/425* (2013.01); *H01M 10/44* (2013.01); *H01M 10/615* (2015.04); *H05B 3/28* (2013.01); *H01M 2010/4271* (2013.01); *Y02T 10/7005* (2013.01)

(56) References Cited

U.S. PATENT DOCUMENTS

2012/0118873 A1     5/2012     Erismis et al.
2017/0150552 A1     5/2017     Erismis et al.

FOREIGN PATENT DOCUMENTS

| | | | | |
|---|---|---|---|---|
| JP | 2007272223 | | 10/2007 | |
| JP | 2007272223 A | * | 10/2007 | |
| KR | 20100040033 A | * | 4/2010 | ............. B82Y 10/00 |
| KR | 1020100040033 | | 4/2010 | |
| KR | 20110040063 A | * | 4/2011 | |
| KR | 1020110040063 | | 4/2011 | |
| KR | 1020120005198 | | 1/2012 | |
| KR | 101128033 | | 4/2012 | |
| KR | 101128033 B1 | * | 4/2012 | ............. H05B 3/145 |
| KR | 20140003370 A | * | 1/2014 | |
| KR | 1020140003370 | | 1/2014 | |
| WO | 2013085126 | | 6/2013 | |

OTHER PUBLICATIONS

KR-20100040033-A Machine Translation. (Year: 2019).*
KR-20110040063-A Machine Translation. (Year: 2019).*
KR-101128033-B1 Machine Translation. (Year: 2019).*
KR-20140003370-A Machine Translation. (Year: 2019).*
Extended European Search Report for European Patent Application No. EP 16792844 corresponding to U.S. Appl. No. 15/573,899 dated Dec. 17, 2018.
Extended European Search Report for European Patent Application No. EP 16792845 corresponding to U.S. Appl. No. 15/573,899 dated Dec. 6, 2018.
English Abstract of KR20110040063 2011.
English Abstract of KR101209174 2012.
English Abstract of KR20120005198 2012.
Machine Translation of KR20120005198 2012.
English Abstract of WO2013085126 2013.
Written Opinion of the International Searching Authority for PCT/KR2016/003283 dated Jul. 15, 2016.
International Search Report for PCT/KR2016/003283 dated Jul. 14, 2016.
International Search Report for PCT/KR2016/003281 dated Aug. 31, 2016.
Written Opinion of the International Searching Authority for PCT/KR2016/003281 dated Aug. 31, 2016.

* cited by examiner

< ELECTRIC LAUNCH MODE >

< ENGINE ONLY MODE >

< ENGINE & MOTOR DRIVE MODE >

< REGENBRAK'G MODE >

BATTERY PRE-HEATING APPARATUS FOR HYBRID VEHICLE AND CONTROL METHOD THEREFOR

PRIORITY INFORMATION

This application is a National Stage filing under 35 U.S.C. § 371 of, and claims priority via, International Application No. PCT/KR2016/003283 for BATTERY PRE-HEATING APPARATUS FOR HYBRID VEHICLE AND CONTROL METHOD THEREFOR, filed Mar. 30, 2016, and pursuant to 35 U.S.C. § 119, this application also claims the benefit of earlier filing date and right of priority to Korean Patent Application Number 10-2015-0067236, filed on May 14, 2015. The entire content of PCT/KR2016/003283 is hereby incorporated by reference. The entire content of Korean Patent Application Number 10-2015-0067236 is hereby incorporated by reference.

BACKGROUND

The hybrid electric vehicle is a future vehicle that adopts an engine and also adopts a motor driving source as an auxiliary power source to promote reduction of generation of exhaust gas and to improve fuel efficiency.

A constitutional example of power transmission for a hybrid electric vehicle may be found in FIG. 8, where an engine (100), a motor (200) and an automatic transmission (300) are arranged in series on one axis, a clutch (400) is arranged between the engine (100) and the motor (200), and a high voltage battery (500) is chargeably and dischargeably connected to the motor (200) as a constitution for operating the abovementioned elements.

In a power transmission and a running mode of a hybrid electric vehicle thus configured, the running mode may include an EV (Electric Vehicle) mode (see FIG. 8*a*) using only a power of the motor, ab HEV (Hybrid Electric Vehicle) mode (see FIG. 8*b*) using an auxiliary power as a turning effect of the motor (200), an engine sole mode (see FIG. 8*c*) using only an engine power for running where a motor functions as a generator for battery charging, and an RB (Regenerative Braking) mode (see FIG. 8*d*) retrieving (re-covering) braking and inertial energy of a vehicle from the motor through generation when the vehicle is braked or running by inertia to charge the energy to a battery.

The battery in the constitution of a hybrid electric vehicle that runs in the above manner may be formed in a battery pack as a unit, where as illustrated in FIG. 7, a width of a main operation area in the battery pack is considerably very narrow, whereas control of temperature for the battery pack to a predetermined level in an actually covered area has a characteristic difficulty.

Particularly, the battery pack creates a problem in a low temperature area, the reason of which is resulted from a drawback that chloridation of electrolyte is progressed quicker during charging than during discharging due to characteristic of battery.

Meantime, a motor, an inverter and a battery, among the elements of a hybrid electric vehicle, are cooled by water cooling system or air cooling system in order to cool these elements, and in case of motor, the motor is cooled by water, the inverter is cooled by water or air cooling system, and the battery is largely cooled by air cooling system. However, unlike general home electric appliances, the hybrid electric vehicle, being a machine that must be operated both in low and high temperature areas, suffers from a severer hardship from temperature changes in each element, and the battery may be the weakest element to the temperature changes. In case of operation at a high temperature (45° C.), a BCM (Battery Control Module) inside a battery module functions to protect the battery module by controlling an output, which however causes reduction in fuel efficiency of a hybrid electric vehicle, and in order to prevent the reduced fuel efficiency, an air cooling fan is employed to control a battery temperature in order to maintain a temperature of 45° C. at all times.

The most difficult problems in controlling a battery temperature occurs when the hybrid electric vehicle is operated at a low temperature area, where the battery capacity is reduced at a low temperature area, chloridation of electrolyte is progressed in response to usage, and life of battery is caused to be shortened, resulting in deterioration of durable life of battery that occupies the lion's share of material cost in the hybrid electric vehicle.

Here, an inner structure and operation of conventional battery pack will be described with reference to FIGS. 5 and 6.

Referring to FIG. 5, a circuit structure inside the conventional battery pack is largely comprised of a battery (10), a safety plug (18) and a PRA (Power Relay Assembly). To be more specific, each battery cell (12) is connected by the safety plug (18), a first main relay (21) of the PRA (20) is connected to an anode side of the battery (10), and a second main relay (22) and a current sensor (23) are connected to a cathode side of the battery (10), and an output terminal of the current sensor (23) is connected to a pre-charge relay (24).

Furthermore, the first and second main relays (21, 22) and the pre-charge relay (24) are controllably turned on and turned off by a BMS (Battery Management System, 40), which is a battery controller.

Thus, as explained in the flowchart of FIG. 6, determination is made as to whether a battery (10) temperature is a temperature capable of performing a hybrid mode operation (engine+motor assist running mode according to battery charging/discharging operations), and each relay (21, 22) is excited by the BMS (40) to implement the charging or discharging of the battery (10).

However, when there is a need of hybrid mode operation at a low temperature area in a circuit structure inside the conventional battery pack, chloridation of battery electrolyte is more quickly generated during a charging operation than in a discharging operation due to low temperature characteristic of battery to shorten life of battery, such that only an operation of re-starting the hybrid mode operation can be possible while being in a stopped state of hybrid mode operation until a battery temperature rises to a predetermined temperature, and thus, the fuel efficiency resultantly drops because the hybrid mode operation cannot be made under a low temperature state, and therefore, there is required a measure of increasing a battery temperature to a temperature where the hybrid mode operation can be started as quickly as possible at a low temperature.

Particularly, in case of hybrid commercial vehicles (buses), a battery pack is mounted at a roof side, whereby a severe heat loss of battery can be generated due to introduction of engine cooling water or heating air through an indoor duct and a pipe mounted on the roof of the vehicle.

An object of the present disclosure is to provide a battery pre-heating apparatus for hybrid electric vehicle configured to propose a battery temperature control measure at a low temperature state in order to maximize a motor assist performance at a low temperature section of a battery, and a control method thereof.

Another object is to provide a battery pre-heating apparatus for hybrid electric vehicle configured to improve fuel efficiency by normalizing a hybrid mode operation at a quicker time, and a control method thereof.

Still another object is to provide a battery pre-heating apparatus for hybrid electric vehicle configured to include a heat generating paste composition drivable at a low voltage and at a low power due to being small in resistance change to temperature and low in specific resistance, and a control method thereof.

In order to solve the technical subject, and in one general aspect of the present disclosure, there is provided a battery pre-heating apparatus for hybrid electric vehicle, the apparatus comprising: a battery comprised of a plurality of battery cells; a power relay assembly including a first main relay connected to both electrode sides for charge/discharge control of a battery; and a pre-heater including at least one plane heater formed through a heat generating paste composition to pre-heat a battery to a predetermined temperature using a power generated from regenerative braking by being connected between an output terminal of the first main relay and an output terminal of the second main relay, wherein the heat generating paste composition includes a carbon nano tube particle 3~6 parts by weight, a carbon nanoparticle 0.5~30 parts by weight, a mixed binder 10~30 parts by weight, an organic solvent 29~83 parts by weight and a dispersant 0.5~5 parts by weight, against a heat generating paste composition 100 parts by weight, and wherein the mixed binder is mixed with epoxy acrylate, polyvinyl acetal and phenolic resin, or mixed with hexamethylene diisocyanate, polyvinyl acetal and phenolic resin.

Preferably, but not necessarily, the apparatus further comprises a pre-heating relay connected to between the output terminal of the first main relay and the pre-heater to receive control of ON/OFF by a BMS (Battery Management System).

Preferably, but not necessarily, the pre-heater may be a heating core mounted at a floor surface of a battery case encompassing a plurality of battery cells to heat a cooling fluid inside a fluid path formed at a lateral surface of the battery case.

Preferably, but not necessarily, the mixed binder may be mixed with polyvinyl acetal 10~150 parts by weight and phenolic resin 100~500 parts by weight, against epoxy acrylate or hexamethylene diisocyanate 100 parts by weight.

Preferably, but not necessarily, the apparatus may further comprise a silane coupling agent 0.5~5 parts by weight against the heat generating paste composition 100 parts by weight.

Preferably, but not necessarily, the carbon nano tube particle may be a multi-wall carbon nano tube particle.

Preferably, but not necessarily, the organic solvent may be a solvent mixed with two or more substances selected from carbitol acetate, butyl carbitol acetate, DBE(dibasic ester), ethyl carbitol, ethyl carbitol acetate, dipropylene glycol methyl ether, cellosolve acetate, bytyl cellosolve acetate, butanol and octanol.

Preferably, but not necessarily, the plane heater may be formed by the heat generating paste composition being screen printed, gravure printed or comma coated on a substrate.

Preferably, but not necessarily, the substrate may be a polyimide substrate, a glass fiber mat, or a ceramic glass.

Preferably, but not necessarily, the plane heater may further include a protective layer coated on an upper surface of the plane heater and formed with an organic matter having a silica or a black pigment such as a carbon black.

Preferably, but not necessarily, the apparatus may further comprise a power supply part supplying an electric power to the plane heater.

In another general aspect of the present disclosure, there is provided a control method of a battery pre-heating apparatus for hybrid electric vehicle, the method comprising: determining whether a temperature of a battery is within a hybrid operable range; exciting a pre-heating relay to allow being turned on, the pre-heating relay being connected to between a first main relay of a power relay assembly, which is one of circuit elements inside a battery pack and a pre-heater, when the temperature of battery is in a low temperature state of being less than the hybrid operable range; supplying a power generated from a motor in response to regenerative braking of a hybrid electric vehicle to the pre-heater through the pre-heating relay; and heating each battery cell inside the battery pack to a predetermined temperature in response to operation of heated pre-heater, wherein the pre-heater includes at least one plane heater formed through a heat generating paste composition, and wherein the heat generating paste composition includes a carbon nano tube particle 3~6 parts by weight, a carbon nanoparticle 0.5~30 parts by weight, a mixed binder 10~30 parts by weight, an organic solvent 29~83 parts by weight and a dispersant 0.5~5 parts by weight, against a heat generating paste composition 100 parts by weight, and wherein the mixed binder is mixed with epoxy acrylate, polyvinyl acetal and phenolic resin, or mixed with hexamethylene diisocyanate, polyvinyl acetal and phenolic resin.

The advantageous effect of a battery pre-heating apparatus for hybrid electric vehicle, and a control method thereof according to the present disclosure may be explained as below: that is, according to at least one of exemplary embodiments of the present disclosure, a battery temperature management measure at a low temperature state may be proposed in order to maximize a motor assist performance of hybrid at a low temperature section.

Furthermore, according to at least one of exemplary embodiments of the present disclosure, fuel efficiency may be improved by normalizing a hybrid mode operation within a fastest possible time.

Still furthermore, according to at least one of exemplary embodiments of the present disclosure, a heat generating paste composition may be included that is drivable at a low voltage and at a low power due to being small in resistance change to temperature and low in specific resistance.

DETAILED DESCRIPTION OF THE DRAWINGS

Figure 1:
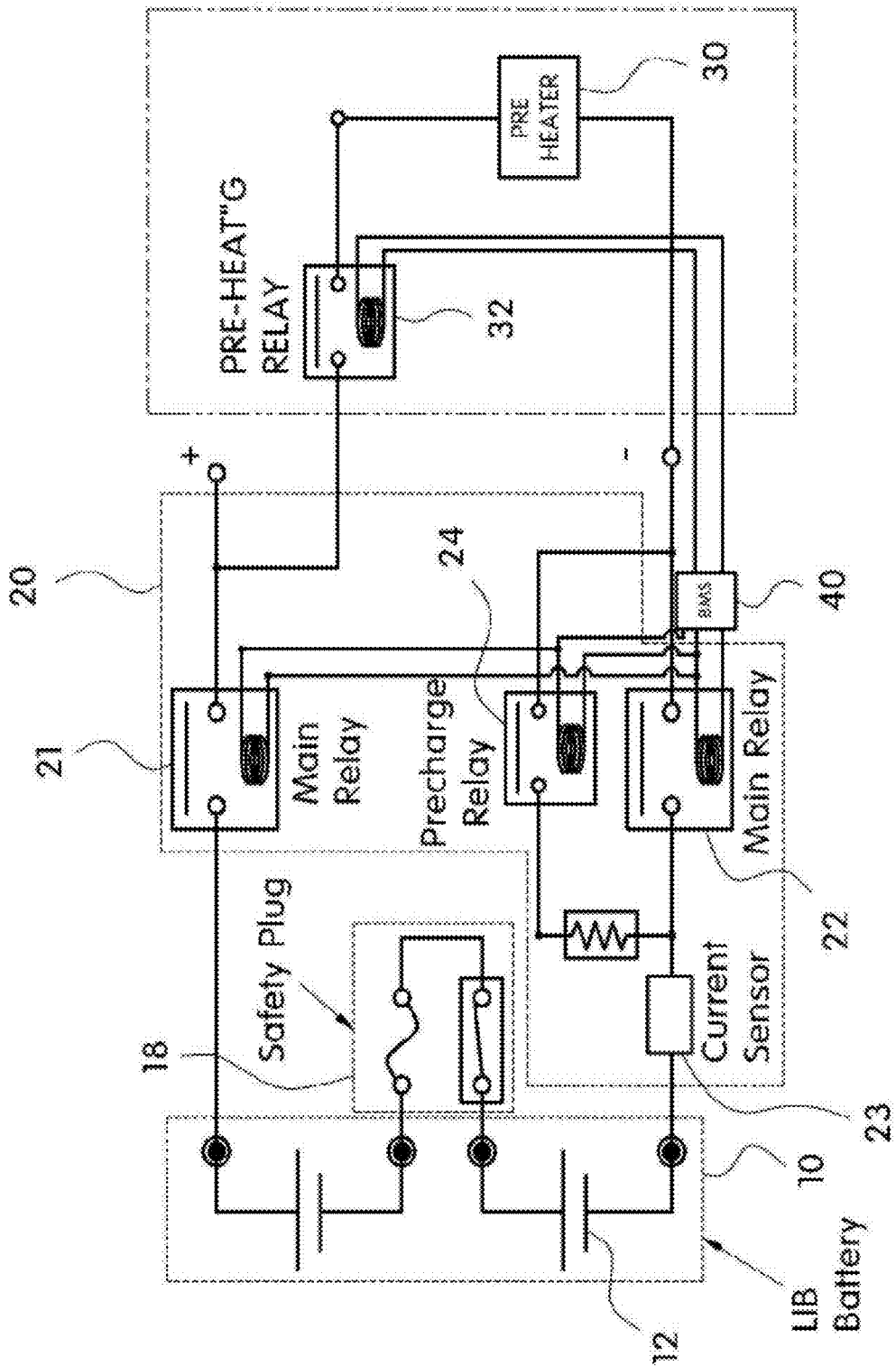
FIG. 1 is a circuit diagram illustrating a battery pre-heating apparatus for hybrid electric vehicle according to the present disclosure.

Exemplary embodiments of the present disclosure will be described in detail with reference to the accompanying drawings. Like reference numerals designate like elements throughout the specification, and any overlapping explanations that duplicate one another will be omitted. Accordingly, in some embodiments, well-known processes, well-known device structures and well-known techniques are not illustrated in detail to avoid unclear interpretation of the present disclosure.

In addition, the terms "-er", "-or", "part" and "module" described in the specification mean units for processing at least one function and operation and can be implemented by hardware components or software components, and combinations thereof. Thus, the terms "-er", "-or", "part" and "module" described in the specification may be provided in consideration of easy preparation of specification and may not have any distinguishing meanings or functions per se.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

In the following attached drawings, numerous specific details are set forth in order to provide a thorough understanding of the present disclosure. However, this disclosure may be embodied in many different forms and should not be construed as limited to any specific structure or function presented throughout this disclosure. Thus, the disclosure described herein is intended to embrace all such alternatives, modifications, variations and applications as may fall within the spirit and scope of the appended claims.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion, for example, "between" versus "directly between," "adjacent" versus "directly adjacent," etc.

As used herein, the terms "a" and "an" are open terms that may be used in conjunction with singular items or with plural items. It will be further understood that the terms "comprises" and/or "comprising," "including," and "having," are inclusive, when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

Hereinafter, a battery pre-heating apparatus for hybrid electric vehicle and a control method thereof according to exemplary embodiments of the present disclosure will be described in detail with reference to the accompanying drawings.

In presenting the present disclosure, it should be appreciated that the present disclosure can be materialized in other particular forms to the knowledge of one skilled in the art within a spirit and within a scope not deviating from essential characteristics of the present disclosure.

As discussed supra, when a temperature condition of battery is outside of an optimal battery operation section, that is, when a temperature of battery is in a low temperature state, a BCM (Battery Control Module) may implement a stopping control of hybrid mode operation in order to prevent a battery charge/discharge, and wait until the temperature of battery rises to an operable range, which is to prevent a motor assist from operating other than an engine power, that is, to prevent the hybrid mode operation because it may work as an adverse element to fuel efficiency.

Furthermore, when the hybrid mode operation is not implemented, it may become a structure difficult to use regenerative braking by a motor to deteriorate a brake performance, and particularly, when a battery is charged using energy (power) generated by using the regenerative braking in a low battery temperature, an environment is generated where life of battery is shortened.

In consideration of foregoing disadvantages, the present disclosure places an emphasis on a point in such a fashion that a pre-heater is installed inside a battery pack, and the pre-heater is operated using a power from the regenerative braking of hybrid electric vehicle to quickly raise a temperature of battery pack in advance while pre-heating the temperature of battery pack in advance, whereby the hybrid mode operation is normally operated within a fastest time.

FIG. 1 is a circuit diagram illustrating a battery pre-heating apparatus for hybrid electric vehicle according to the present disclosure.

Referring to FIG. 1, a circuit configuration inside a battery pack may be largely divided to a battery (10), a safety plug (18), and a PRA (Power Relay Assembly, 20), where each battery cell (12) is connected by a safety plug (18), a first main relay (21) of the PRA (20) is connected to an anode side of the battery (10), and a second main relay (22) and a current sensor (23) are connected to a cathode side of the battery (10), and an output terminal of the current sensor (23) is connected to a pre-charge relay (24).

Particularly, the PRA (20) is a configuration for charge/discharge control of the battery (10), and may be comprised of a first main relay (21) connected to an anode side of the battery (10), and a second main relay (22) connected to a cathode side of the battery (10), and a pre-heater (30) is wired that pre-heat the battery (10) to a predetermined temperature using a power generated by regenerative braking between an output terminal of the first main relay (21) and an output terminal of the second main relay (22).

Furthermore, a pre-heating relay (32) is connected to between the output terminal of the first main relay (21) and the pre-heater (30), where the pre-heating relay (32) controls the operation of the pre-heater (30) while receiving an ON/OFF control of a BMS ((Battery Management System, 40). At this time, the first and second main relays (21, 22), the pre-charge relay (24) and the pre-heating relay (32) are controlled in ON/OFF by the BMS (40).

Furthermore, the pre-heater (30) may include at least one plane heater. The plane heater included in the pre-heater (30) may be formed by the heat generating paste composition being screen printed, gravure printed or comma coated on a substrate. The plane heater included in the pre-heater (30) and the heat generating paste composition will be described in detail later.

Thus, when the pre-heater (30), i.e., a heating core, is operated by a power generated by a motor in response to regenerative braking, a cooling fluid inside a fluid path (16) formed by a lateral surface of a battery case (14) is heated, and the heated heat is transmitted to inside of the battery case to heat each battery cell. Here, a control operation of the battery pre-heating apparatus thus configured according to the present disclosure will be explained.

Figure 2:
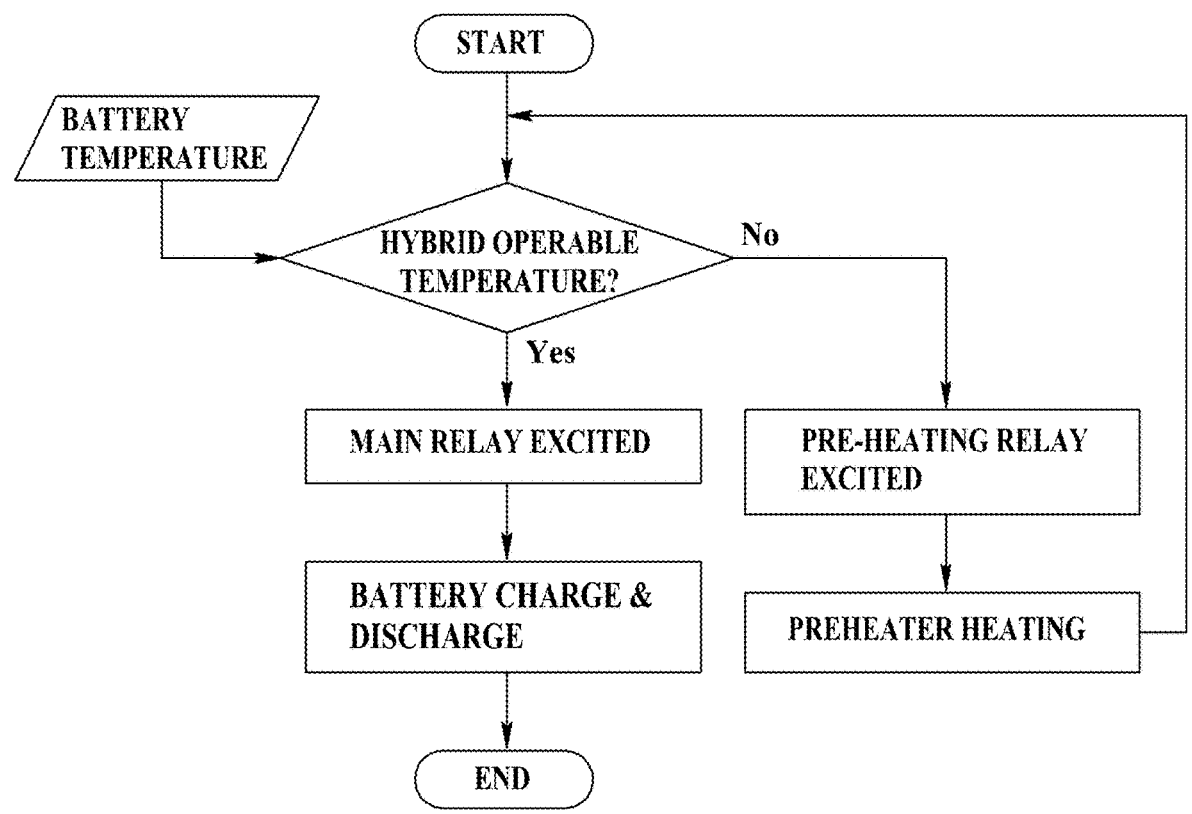
FIG. 2 is a flow chart illustrating a control operation of a battery pre-heating apparatus for hybrid electric vehicle according to the present disclosure.
Figure 3:
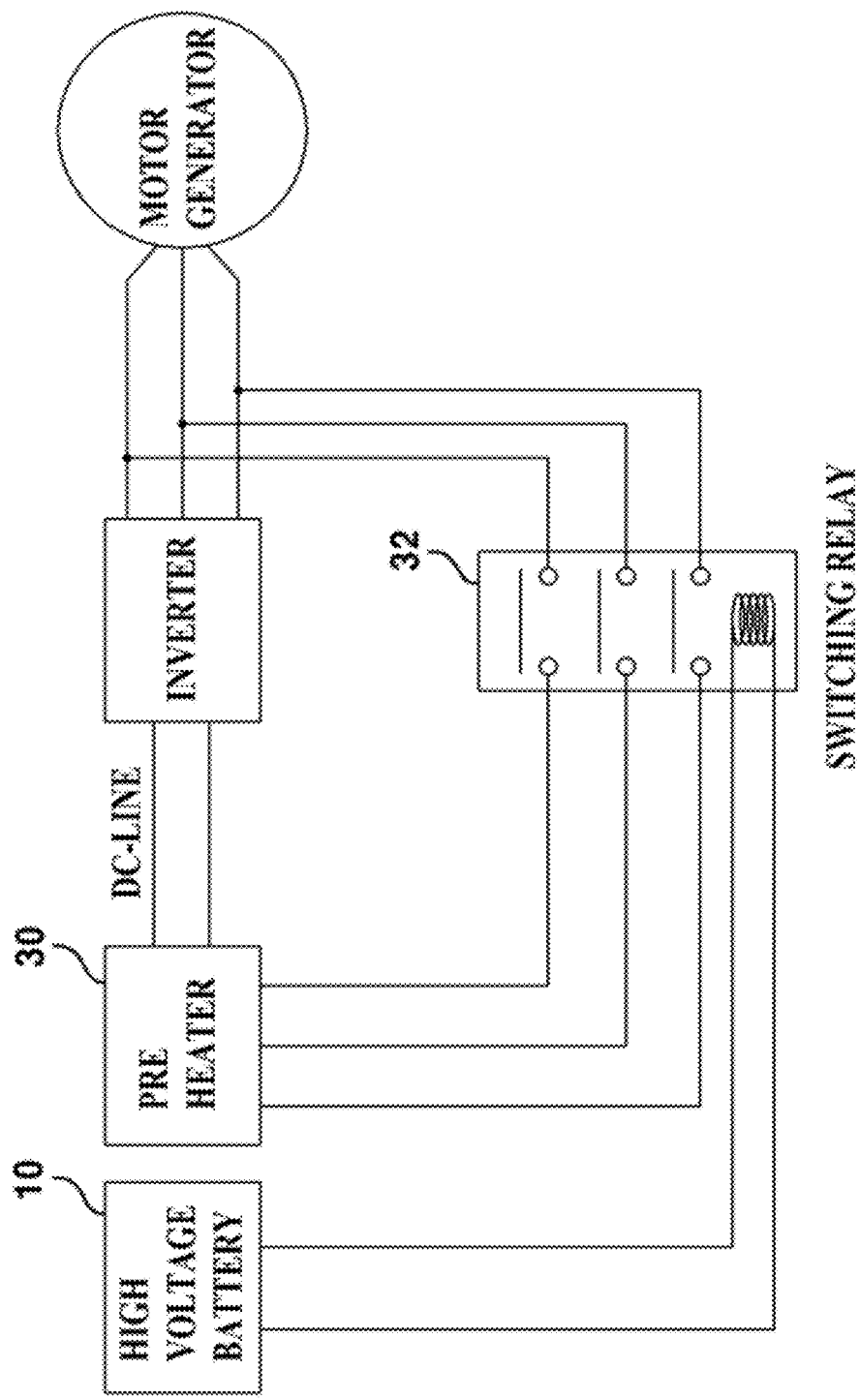
FIG. 3 is a circuit diagram illustrating an operation by regenerative braking of battery pre-heating apparatus for hybrid electric vehicle according to the present disclosure.
Figure 4:
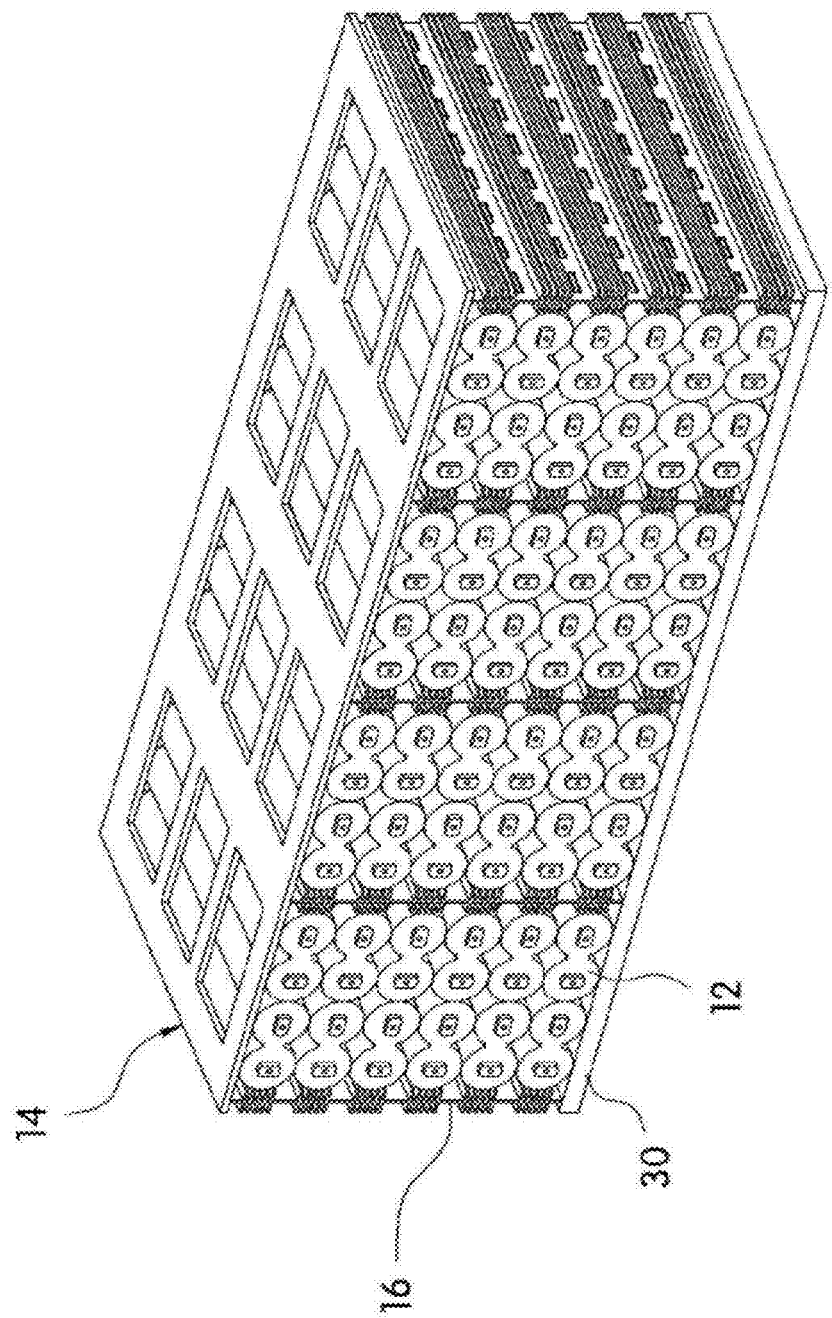
FIG. 4 is a schematic view illustrating a configuration of a pre-heater in a battery pre-heating apparatus for hybrid electric vehicle according to the present disclosure.
Figure 5:
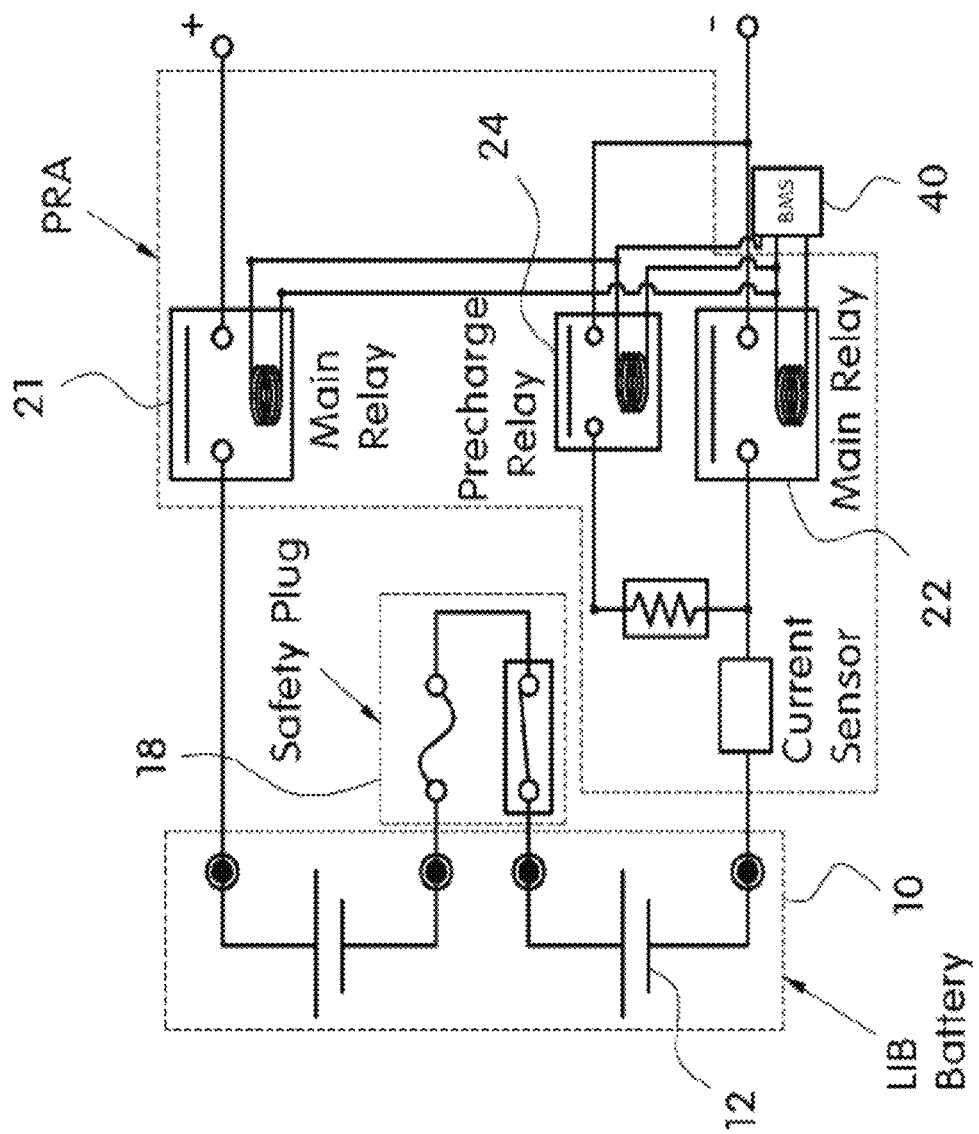
FIG. 5 is a circuit diagram inside a battery pack according to prior art.
Figure 6:
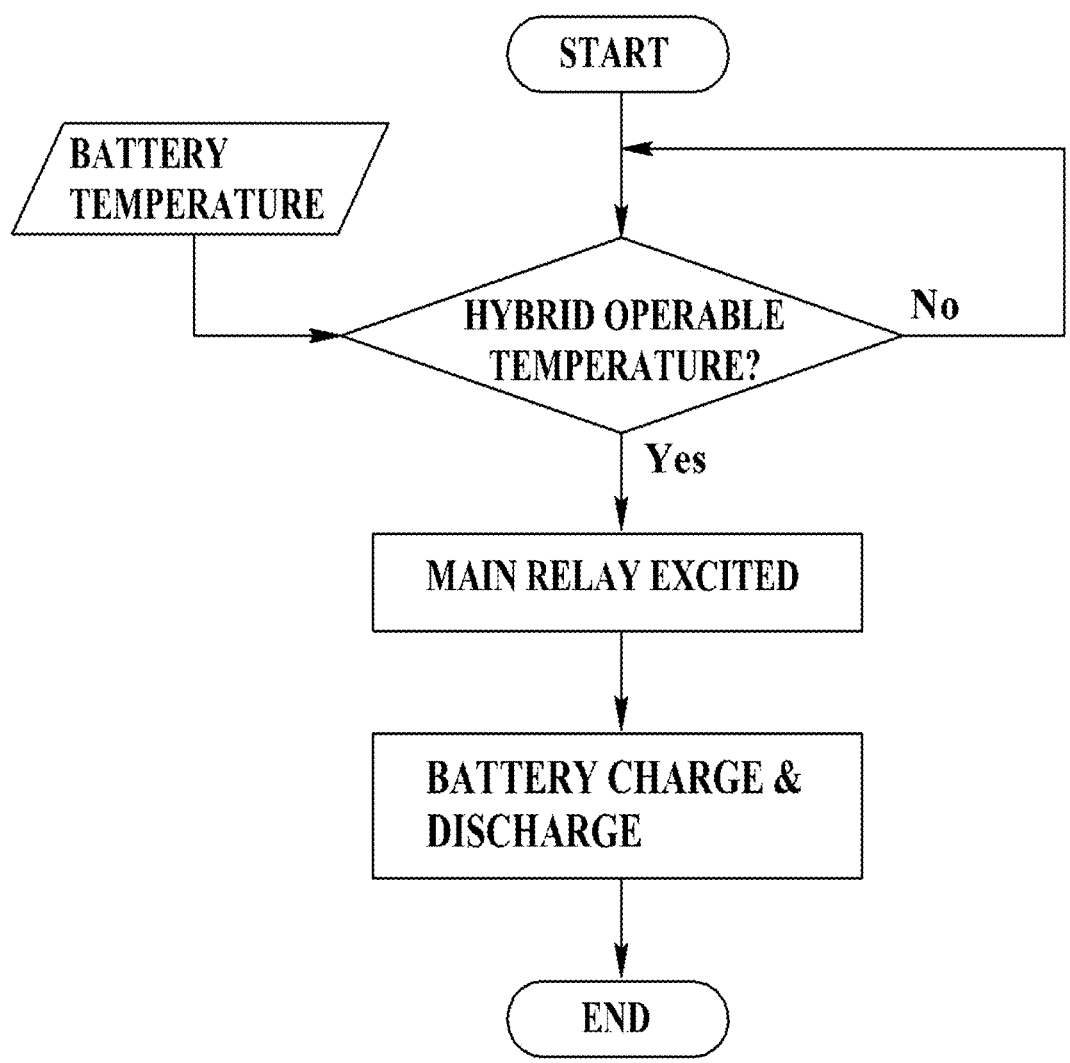
FIG. 6 is a charge/discharge flowchart by a circuit configuration inside a battery pack according to prior art.
Figure 7:
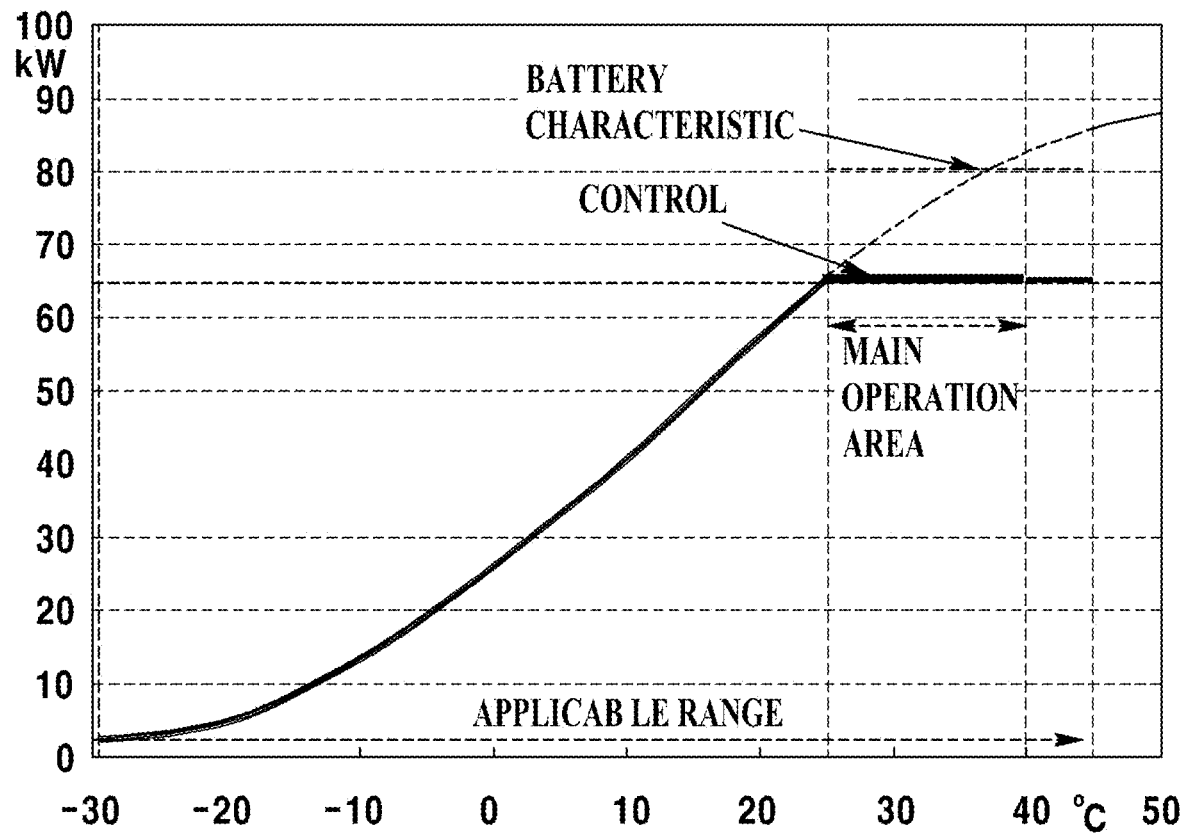
FIG. 7 is a graph explaining an operation characteristic in response to a temperature of battery in a hybrid electric vehicle.
Figure 8A:
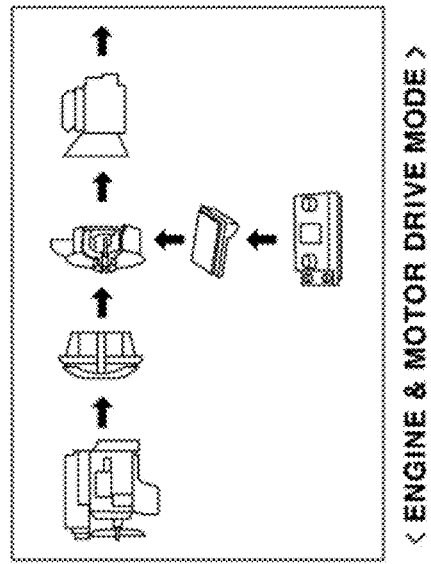
FIGS. 8(a)-8(d) are schematic views illustrating exemplary configurations for power transmission of hybrid electric vehicle and a running mode thereof.
Figure 8C:
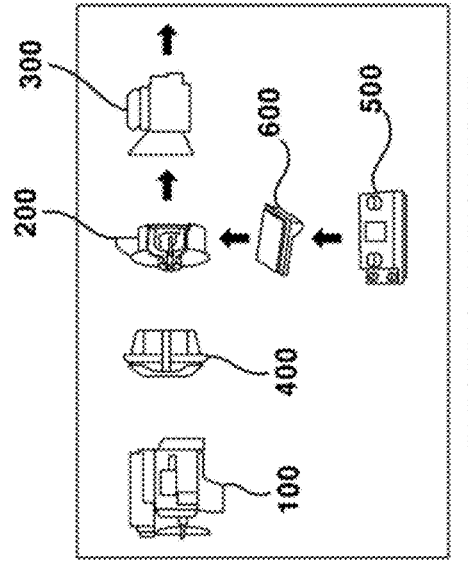
Figure 8B:
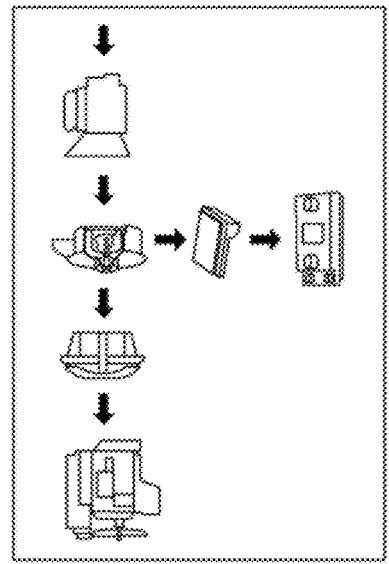
Figure 8D:
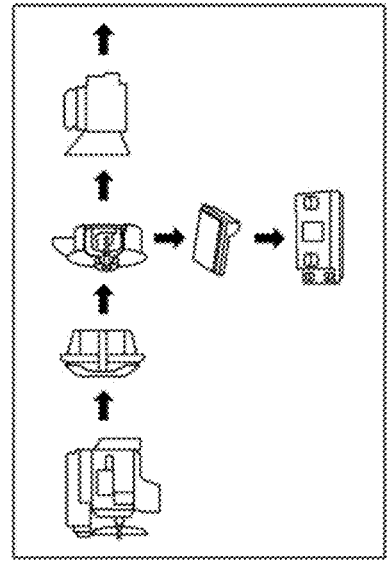

FIG. 2 is a flow chart illustrating a control operation of a battery pre-heating apparatus for hybrid electric vehicle according to the present disclosure, and FIG. 3 is a circuit diagram illustrating an operation by regenerative braking of battery pre-heating apparatus for hybrid electric vehicle according to the present disclosure.

First of all, determination is made whether a temperature of battery (10) is within a hybrid mode (engine+motor assist mode) operable range. As a result of determination, if it is determined that the temperature of battery (10) is in a low temperature state, i.e., less than a hybrid mode operable range, the pre-heating relay (32) connected between the first main relay (21) of the PRA (20) and the pre-heater (30) is excited and turned on by a control signal of the BMS (40).

Of course, if it is determined that the temperature of battery (10) is within the hybrid mode operable range, the first and second main relays (21, 22) are excited and turned on to allow implementing a normal charge/discharge of battery. When the pre-heating relay (32) is excited and turned on, the pre-heater (40) is in an electrically conductive state with a motor (MG: Moto & Generator). At this time, when the regenerative braking of the hybrid electric vehicle is realized, a power generated by the motor in response to the regenerative braking is supplied to the pre-heater (30) through the pre-heating relay (32) to start a heating operation of the pre-heater (30).

Here, the pre-heater (30) may include at least one plane heater. The plane heater included in the pre-heater (30) may be formed by the heat generating paste composition being screen printed, gravure printed or comma coated on a substrate. The plane heater included in the pre-heater (30) and the heat generating paste composition will be described in detail later.

That is, the pre-heater (30), i.e., a heating core, installed at a floor surface of the battery case (14) is starts a heating operation to heat the cooling fluid inside the fluid path (16) formed at the lateral surface of the battery case (14) and the heated heat resultantly heats the battery cells inside the battery case. Thus, each battery cell (12) inside the battery pack is heated by the heated operation of the pre-heater (30) to a predetermined temperature, preferably to a hybrid mode operable battery temperature. That is, the hybrid mode operation can be normally worked out within a fastest time by quickly heating the battery of low temperature to a hybrid mode operable temperature.

The thick film-forming heat generating paste composition (hereinafter referred to as "heat generating paste composition") according to an exemplary embodiment of the present disclosure may include a carbon nano tube particle, a carbon nano particle, a mixed binder, an organic solvent and a dispersant.

To be more specific, the heat generating composition may include a carbon nano tube particle 3~6 parts by weight, a carbon nano particle 0.5~30 parts by weight, a mixed binder 10~30 parts by weight, an organic solvent 29~83 parts by weight and a dispersant 0.5~5 parts by weight, against a heat generating paste composition 100 parts by weight.

The carbon nano tube particle may be selected from a single walled carbon nano tube, a double-walled carbon nanotube, a multi-wall nano tube or a mixture thereof. For example, the carbon nano tube particle may be a multi-wall nano tube. When the carbon nano tube particle is a multi-wall carbon nano tube, a diameter may be 5~30 nm, and a length may be 3 μm~40 μm. The carbon nano tube particle may be a graphic nano particle, and a diameter may be 1 μm~25 μm, for example.

The mixed binder may function to allow the heat generating paste composition to have a heat resistance even within a temperature range of about 300° C., and have a shape mixed with epoxy acrylate, hexamethylene diisocyanate, polyvinyl acetal and phenol resin. For example, the mixed binder may be a mixed shape of epoxy acrylate, polyvinyl acetal and phenol resin, or may be a mixed shape of hexamethylene diisocyanate, polyvinyl acetal and phenol resin. The present disclosure has an advantageous effect in that there is no resistance change in material or damage to the piece even in a high temperature of about 300° C. by increasing the heat resistance of the mixed binder.

Here, the phenol resin means a phenol compound including phenol and phenol derivative. For example, the phenol derivative may include p-cresol, o-guaiacol, creosol, catechol, 3-methoxy-1,2-benzenediol, homocatechol, vinylguaiacol, syringol, iso-eugenol, methoxyeugenol, o-cresol, 3-methoxy-1,2-benzenediol, (z)-2-methoxy-4-(1-propenyl)-phenol, 2,6-dimethoxy-4-(2-propenyl)-phenol, 3,4-dimethoxy-phenol, 4ethyl-1,3-benzenediol, resole phenol, 4-methyl-1,2-benzenediol, 1,2,4-Benzenetriol, 2-methoxy-6-methylphenol, 2-methoxy-4-vinylphenol, or 4-ethyl-2-methoxy-phenol, but the present disclosure is not limited thereto.

The mixed ratio of the mixed binder may be polyvinyl acetal resin 10~150 parts by weight or phenol resin 100~500 parts by weight against epoxy acrylate or hexamethylene diisocyanate 100 parts by weight. When the content of phenol resin is less than 100 parts by weight, the heat resistance of the heat generating paste composition may deteriorate, and when the content of phenol resin is more than 500 parts by weight, the flexibility of the heat generating paste composition may deteriorate (brittleness increased).

The organic solvent is to disperse conductive particles and mixed binder, and may be a solvent mixed with two or more substances selected from carbitol acetate, butyl carbitol acetate, DBE(dibasic ester), ethyl carbitol, ethyl carbitol acetate, dipropylene glycol methyl ether, cellosolve acetate, butanol and octanol.

Meantime, the process for dispersion may be applied with conventionally used various methods, and may be realized, for example, through ultra-sonication, roll mill, bead mill or ball mill processes.

The dispersant is used to further facilitate the dispersion, and may use a conventional dispersant used in the relevant industries such as BYK dispersant, an amphoteric surfactant such as triton X-100, and an ionic surfactant such as SDS.

The heat generating paste composition according to an exemplary embodiment of the present disclosure may further comprise a silane coupling agent 0.5~5 parts by weight against the heat generating paste composition 100 parts by weight.

The silane coupling agent functions to increase an adhesive strength among resins when the heat generating paste compositions are mixed. The silane coupling agent may be epoxy-containing silane or mercapto-containing silane.

An example of silane coupling agent may include, epoxy-contained 2-(3,4 epoxy cyclohexyl)-ethyltrimetoxysilane, 3-glycidoxytrimethoxysilane, 3-glycidoxypropyltriethoxysilane and 3-glycidoxypropyltriethoxysilane, and amine group-contained N-2(amino-ethyl)3-aminopropylmethyldimethoxysilane, N-2(amino-ethyl)3-aminopropyltrimethoxysilane, N-2(amino-ethyl)3-aminopropyltrimethoxysilane, 3-aminopropyltriethoxysilane, 3-aminopropyltriethoxysil, 3-triethoxysily-N-(1,2-dimethylbutylidene) propylamin, N-phenyl-3-aminopropyltrimethoxysilane, and mercapto-contained 3-mercapto propylmethyldimethoxysilane, 3-mercaptopropyltriethoxysilane, and isocyanate-contained 3-isocyanatepropyltriethoxysilane, and the present disclosure is not limited to what is enumerated above.

The present disclosure may further provide a plane heater in which the heat generating paste composition according to the exemplary embodiment of the present disclosure is formed on a substrate by screen-printing, gravure-printing (and roll-to-roll gravure printing) or comma printing (and roll-to-roll comma printing).

Here, the substrate may include polycarbonate, PET, PEN, polyimide, cellulose ester, nylon, polypropylene, polyacrylonitrile, polysulfone, polyether sulfone, polyvinylidene fluoride, glass, glass fiber(mat), ceramic, SUS, copper or aluminum substrate, and the present disclosure is not limited thereto. The substrate may be adequately selected depending on applicable industries of heater and used temperature.

The plane heater may be formed in such a manner that the heat generating paste composition according to the exemplary embodiment of the present disclosure is formed on a substrate in a desired pattern by screen-printing, gravure-printing (and roll-to-roll gravure printing) or comma printing (and roll-to-roll comma printing), drying, and curing, where an Ag paste or a conductive paste may be formed on the substrate, which is then dried and cured to allow forming an electrode.

Alternatively, an Ag paste or a conductive paste may be formed on a substrate, printed, dried/cured, and then, the heat generating paste composition according to the exemplary embodiment of the present disclosure may be screen-printed or gravure-printed thereon to form an electrode.

Meantime, the plane heater may further include a protective layer coated on an upper surface. The protective layer may be formed with silica ($SiO_2$). When the protective layer is formed with silica, to heater can advantageously maintain flexibility even if coated on a heat generating surface.

Hereinafter, a heat generating paste composition for forming a thick film and a plane heater using the same will be described in detail through experimental examples. The below experimental examples are simply exemplary and therefore, the present disclosure is not limited thereto.

EXPERIMENTAL EXAMPLES (1) Preparation of Exemplary Embodiments & Comparative Examples Exemplary embodiments (three types) and comparative examples (three types) were prepared as shown in the following Table 1. It is to be mentioned that the composition ratios indicated in Table 1 are described in weight %.

TABLE 1

|  | Exemplary 1 | Exemplary 2 | Exemplary 3 | Comparative 1 | Comparative 2 | Comparative 3 |
| --- | --- | --- | --- | --- | --- | --- |
| CNT particle | 4 | 5 | 6 | 4 | 5 | 6 |
| CNP particle | 8 | 9 | 15 | — | — | — |
| Mixed binder | 20 | 15 | 22 | — | — | — |
| Ethyl cellulose | — | — | — | 10 | 12 | 14 |
| Organic solvent | 63 | 67 | 52 | 82 | 79 | 76 |
| Dispersant (BYK) | 5 | 4 | 5 | 4 | 4 | 4 |

In case of the exemplary embodiments, CNT particles and CNP particles (exemplary embodiments 1~3) were added to the carbitol acetate solvent according to the composition in Table 1, and BYK dispersant was added, and a dispersing solution A was manufactured through a 60-minute ultrasonic wave treatment. Thereafter, the mixed binder was added to the carbitol acetate solvent to obtain a master batch through mechanical agitation. Next, the dispersing solution A and the master batch were initially kneaded and secondarily kneaded through 3-roll-mill processes to manufacture a heat generating paste composition.

In case of the comparative examples, CNT particles were added to the carbitol acetate solvent according to the composition in Table 1, and BYK dispersant was added, and a dispersing solution was manufactured through a 60-minute ultrasonic wave treatment. Thereafter, ethyl cellulose was added to the carbitol acetate solvent to obtain a master batch through mechanical agitation. Next, the dispersing solution B and the master batch were initially kneaded and secondarily kneaded through 3-roll-mill processes to manufacture a heat generating paste composition.

(2) Evaluation of Properties in Plane Heater

The plane heater sample was manufactured by screen-printing and curing the heat generating paste composition according to the exemplary embodiments and comparative examples in 10×10 cm size on a polyimide substrate, and printing and curing an Ag paste electrode on both upper distal ends.

In connection therewith, FIG. 9 is an image of specimen piece of a plane heater using a heat generating paste composition in a glass heating device according to an exemplary embodiment of the present disclosure. FIG. 9a is a plane heater formed by allowing a heat generating paste composition to be screen-printed on a polyimide substrate, FIG. 9b is a plane heater formed by allowing the heat generating paste composition to be screen-printed on a glass fiber mat. FIGS. 9c and 9d are an image where a protective layer is coated on an upper surface of a plane heater of FIG. 9a (a black protective layer is coated in case of FIG. 9c, and a green protective layer is coated in case of FIG. 9d).

Figure 9A:
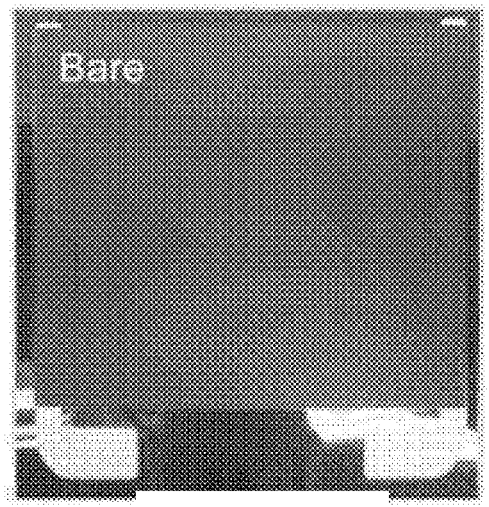
FIGS. 9(a)-9(d) are images of specimen pieces of plane heaters using a heat generating paste composition included in a heater apparatus for electric vehicle according to an exemplary embodiment of the present disclosure.
Figure 9B:
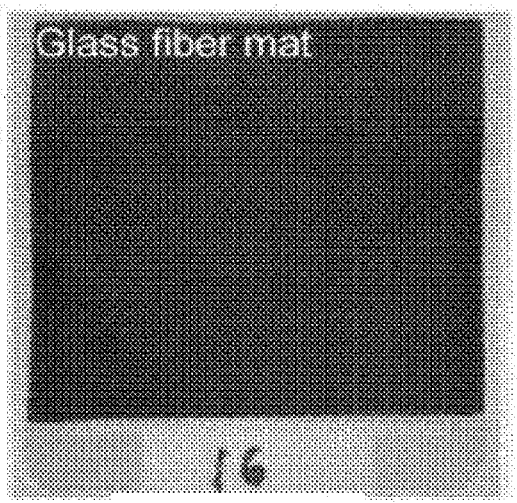
Figure 9C:
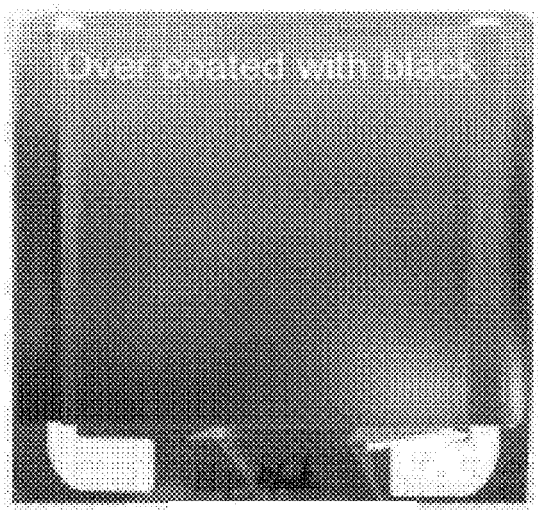
Figure 9D:
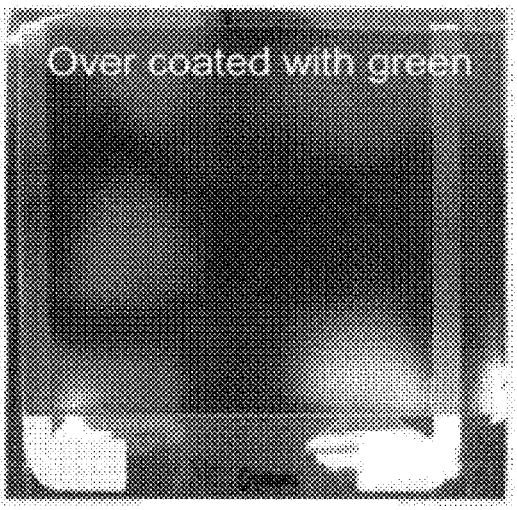

Specific resistances of plane heater samples are measured that were manufactured according to the plane heater samples (exemplary embodiments) and plane heater samples (comparative examples) as shown in FIG. 9a (The applied currents/voltages are indicated in Table 2). Furthermore, in order to ascertain a risen temperature effect in response to the applied currents/voltages, the plane heaters corresponding to the exemplary embodiments and comparative examples were respectively increased in temperature to 40° C., 100° C. and 200° C., and DC voltages and currents were measured at the time of arriving at those temperatures.

Figure 10:
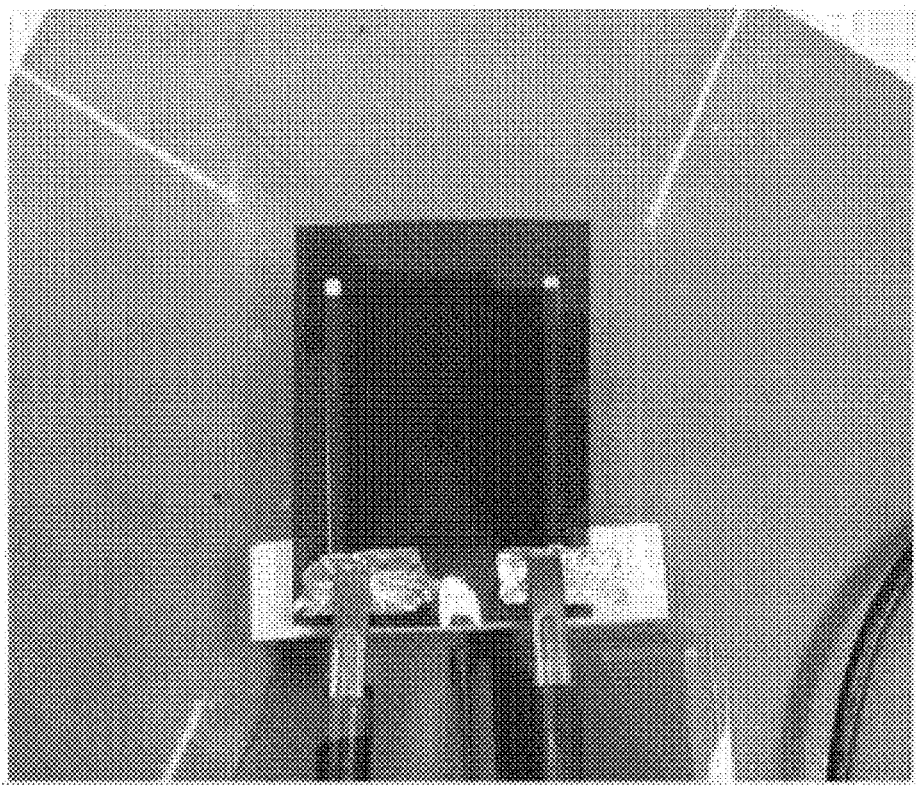
FIG. 10 is an image of a heat generation stability test of a plane heater manufactured by an exemplary embodiment of a heater apparatus for electric vehicle according to an exemplary embodiment of the present disclosure and a plane heater manufactured by a comparative example.

Furthermore, heat generation stability was tested for each sample at a temperature of 200° C. In connection therewith, FIG. 10 is an image of a heat generation stability test of a plane heater manufactured by an exemplary embodiment of a glass heating device according to an exemplary embodiment and by a comparative example, the results of which are shown in Table 2.

the exemplary embodiments were measured smaller than those of the plane heaters corresponding to the comparative examples. That is, it could be ascertained that the plane heaters corresponding to the exemplary embodiments were driven at lower voltages and currents than those of the plane heaters corresponding to the comparative examples.

Furthermore, the plane heaters according to the exemplary embodiments 1~3 have shown to maintain stability for over 20 days under heat generation driving at 200° C. (no separate protective layers), whereas defect phenomena were observed from the plane heaters corresponding to the comparative examples that surface of heat generation part bulged within 2 hours during heat generation driving at 200° C. That is, it could be ascertained that the plane heaters according to the exemplary embodiments were also stably driven at temperatures higher than 200° C. over the plane heaters corresponding to the comparative examples.

The present disclosure may additionally provide the abovementioned plane heater and a portable heater including a power supply part supplying a power to the plane heater.

Here, the power supply part may include a lead electrode formed by being coated at left/right sides of the plane heater, and a power connection electrode formed by being attached to the lead electrode. In some cases, the power connection electrode may be directly connected to the plane heater. The lead electrode or the power connection electrode may be formed by using an Ag paste, a Cu paste and a Cu tape.

The plane heater of the portable heater according to the present disclosure may be attached, embedded or mounted at an inside/outside of a body, and may take a shape of being mounted with a power supply part for driving the plane heater. The portable heater may be used for an inner sheet of a baby carriage, heat generating socks, heat generating shoes, a heat generating hat or cap, a portable heat generating mat, a portable cooker, and a vehicular heat generating sheet.

Particularly, the advantage is that the plane heater employed for the portable heater according to the present

TABLE 2

| | Exemplary 1 | Exemplary 2 | Exemplary 3 | Comparative 1 | Comparative 2 | Comparative 3 |
|---|---|---|---|---|---|---|
| Specific resistance × $10^{-2}$ Ωcm | 1.9 | 2.55 | 2.96 | 9.73 | 8.52 | 6.23 |
| Arriving at 40° C., DC driving voltage/current | 5 V/0.2 A | 6 V/0.2 A | 7 V/0.2 A | 20 V/0.3 A | 16 V/0.2 A | 12 V/0.2 A |
| Arriving at 100° C., DC driving voltage/current | 9 V/0.5 A | 12 V/0.4 A | 14 V/0.5 A | 48 V/0.7 A | 40 V/0.7 A | 26 V/0.6 A |
| Arriving at 200° C., DC driving voltage/current | 20 V/0.6 A | 24 V/0.7 A | 24 V/1.0 A | — | — | — |
| Heat generation stability (day) | Over 20 days | Over 20 days | Over 20 days | bad | bad | bad |

Referring to the above Table 2, the specific resistances of plane heaters corresponding to the exemplary embodiments were measured smaller than the specific resistances of plane heaters corresponding to the comparative examples, and as a result, the driving voltages/currents necessary for reaching respective temperatures of plane heaters corresponding to disclosure can be driven with a lower voltage and current as elaborated in the foregoing, and therefore may be driven by a chargeable and dischargeable secondary cell battery to thereby enhance the portability, and to greatly increase the use time.

After all, in order to maximize the hybrid motor assist performance at a low temperature section of battery, the battery pre-heating apparatus for hybrid electric vehicle and the control method thereof according to the present disclosure can provide a battery temperature management measure at a low temperature state, and may include a heat generating paste composition low in resistance change caused by temperatures and drivable in a low voltage and a low electric power due to low specific resistance.

Although the abovementioned embodiments according to the present disclosure have been described in detail with reference to the above specific examples, the embodiments are, however, intended to be illustrative only, and thereby do not limit the scope of protection of the present disclosure. Thereby, it should be appreciated by the skilled in the art that changes, modifications and amendments to the above examples may be made without deviating from the scope of protection of the disclosure.

The invention claimed is:

1. A battery pre-heating apparatus for hybrid electric vehicle, the apparatus comprising:
   a battery comprised of a plurality of battery cells;
   a power relay assembly including a first main relay connected to both electrode sides for charge/discharge control of a battery; and
   a pre-heater including at least one plane heater formed through a heat generating paste composition to pre-heat a battery to a predetermined temperature using a power generated from regenerative braking by being connected between an output terminal of the first main relay and an output terminal of the second main relay, wherein the heat generating paste composition includes a carbon nano tube particle 3~6 parts by weight, a carbon nanoparticle 0.5~30 parts by weight, a mixed binder 10~30 parts by weight, an organic solvent 29~83 parts by weight and a dispersant 0.5~5 parts by weight, against a heat generating paste composition 100 parts by weight, and wherein the mixed binder is mixed with epoxy acrylate, polyvinyl acetal, and phenolic resin and wherein the mixed binder is mixed with weight ratio of polyvinyl acetal 10~150: phenolic resin 100~500: epoxy acrylate 100.

2. The battery pre-heating apparatus of claim 1, further comprising a pre-heating relay connected to between the output terminal of the first main relay and the pre-heater to receive control of ON/OFF by a battery management system.

3. The battery pre-heating apparatus of claim 1, wherein the pre-heater is a heating core mounted at a floor surface of a battery case encompassing a plurality of battery cells to heat a cooling fluid inside a fluid path formed at a lateral surface of the battery case.

4. The battery pre-heating apparatus of claim 1, further comprising a silane coupling agent 0.5~5 parts by weight against the heat generating paste composition 100 parts by weight.

5. The battery pre-heating apparatus of claim 1, wherein the carbon nano tube particle is a multi-wall carbon nano tube particle.

6. The battery pre-heating apparatus of claim 1, wherein the organic solvent is a solvent mixed with two or more substances selected from carbitol acetate, butyl carbitol acetate, dibasic ester, ethyl carbitol, ethyl carbitol acetate, dipropylene glycol methyl ether, cellosolve acetate, bytyl cellosolve acetate, butanol and octanol.

7. The battery pre-heating apparatus of claim 1, wherein the plane heater is formed by the heat generating paste composition being screen printed, gravure printed or comma coated on a substrate.

8. The battery pre-heating apparatus of claim 7, wherein the substrate is a polyimide substrate, a glass fiber mat, or a ceramic glass.

9. The battery pre-heating apparatus of claim 7, wherein the plane heater further includes a protective layer coated on an upper surface of the plane heater and formed with an organic matter having a silica or a black pigment such as a carbon black.

10. The battery pre-heating apparatus of claim 1, further comprising a power supply part supplying an electric power to the plane heater.

11. A control method of a battery pre-heating apparatus for hybrid electric vehicle, the method comprising:
    determining whether a temperature of a battery is within a hybrid operable range;
    exciting a pre-heating relay to allow being turned on, the pre-heating relay being connected to between a first main relay of a power relay assembly, which is one of circuit elements inside a battery pack and a pre-heater, when the temperature of battery is in a low temperature state of being less than the hybrid operable range;
    supplying a power generated from a motor in response to regenerative braking of a hybrid electric vehicle to the pre-heater through the pre-heating relay; and
    heating each battery cell inside the battery pack to a predetermined temperature in response to operation of heated pre-heater, wherein the pre-heater includes at least one plane heater formed through a heat generating paste composition, and wherein the heat generating paste composition includes a carbon nano tube particle 3~6 parts by weight, a carbon nanoparticle 0.5~30 parts by weight, a mixed binder 10~30 parts by weight, an organic solvent 29~83 parts by weight and a dispersant 0.5~5 parts by weight, against a heat generating paste composition 100 parts by weight, and wherein the mixed binder is mixed with epoxy acrylate, polyvinyl acetal, and phenolic resin and wherein the mixed binder is mixed with weight ratio of polyvinyl acetal 10~150: phenolic resin 100~500:epoxy acrylate 100.

* * * * *